March 13, 1962     R. KUNZ     3,025,002

SKID SHOE FOR AUTOMOBILES

Filed July 25, 1960

ROBERT KUNZ
*INVENTOR.*

BY *Atty.*

United States Patent Office 3,025,002
Patented Mar. 13, 1962

3,025,002
SKID SHOE FOR AUTOMOBILES
Robert Kunz, 5 Butternut St., Toronto, Ontario, Canada
Filed July 25, 1960, Ser. No. 44,977
1 Claim. (Cl. 238—14)

This invention relates to improvements in skid shoes for automobiles and particularly it pertains to an improved device of this type which can be manufactured at low cost and which is effective in use.

Devices for freeing motor vehicles that have been stuck in snow drifts or on icy roads have been known for some time but most of these devices have been impractical due to the excessive cost or due to their large size which made it impractical to carry same in the automobile. In the present invention, I have eliminated the difficulty and short-comings inherent in the formerly known articles of this type by means as will be shown hereinafter.

An important object of my invention is to provide a skid shoe which is effective in freeing vehicles which have been stuck on ice or snow.

Another object of my invention is to provide a skid shoe of simple contact and low cost design which can be easily carried at all times as an emergency device.

Other objects and advantages of my invention are apparent during the course of the following description.

Figure 1:
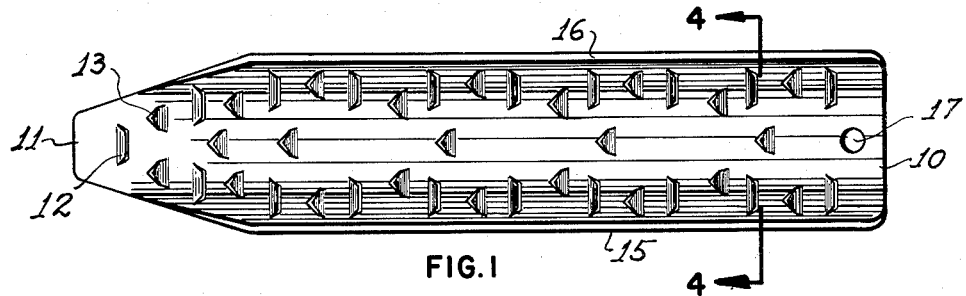
Figure 2:
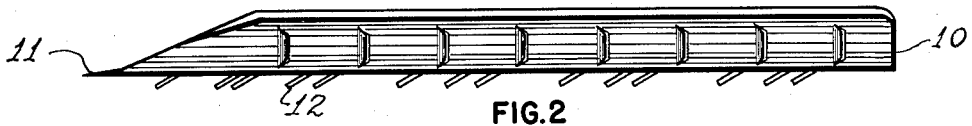
Figure 3:
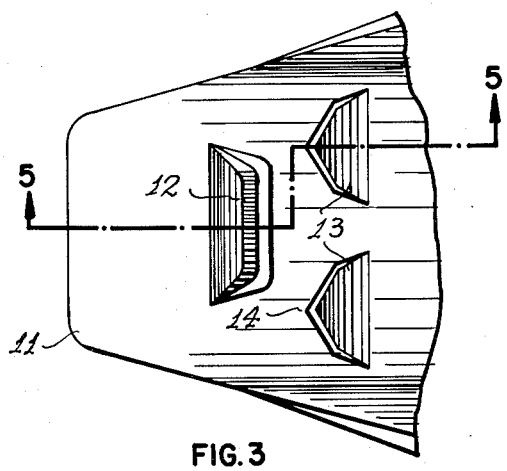
Figure 4:
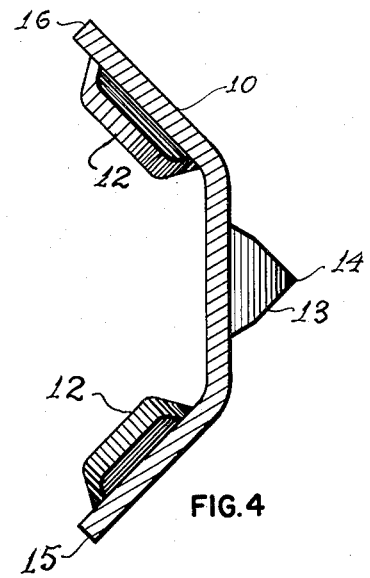
Figure 5:
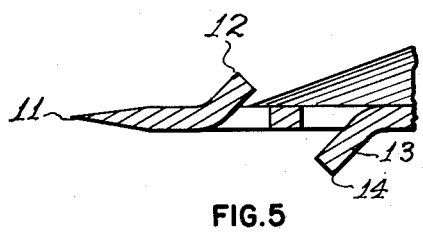

In the accompanying drawing forming a part of this specification, and in which like numerals are employed to desigate like parts in the same, FIGURE 1 is a plan view of a device embodying my invention, FIGURE 2 is a side elevation of the device shown in FIGURE 1, FIGURE 3 represents an enlarged partial plan view of the front end of the device shown in FIGURE 1, FIGURE 4 represents a section taken along line 4—4 in FIGURE 1, and FIGURE 5 represents a section taken along the line 5—5 in FIGURE 3.

In the drawing, wherein for the purpose of illustration is shown a preferred embodiment of my invention, the numeral 10 designates the body plate from which my invention is made. This plate is punched out in a die in the shape shown in FIGURE 1 with a tapered nose 11, which is suitable for inserting under the wheels of the automobile. The plate 10 is furthermore perforated in the numerous places and little tongues are bent out as indicated in the drawing. These tongues are two kinds as particularly illustrated in FIGURE 4. On the inside, there are the blunt tongues 12 over which the tire may roll without damage and which provide a grip for the tire tread. There is furthermore the sharp tongues 13 on the outside which are distributed in a pattern as indicated in FIGURE 1 and which have a sharp point 14 which will dig into even the hardest ice.

The sides 15 and 16 of the plate 10 are bent up as indicated in FIGURE 4 thus affording a better grip on the tire and preventing slippage between the tire and the skid shoe. The skid shoe is supplied with a hole 17 for hanging or for tieing together in shipment. The plate 10 from which the skid shoe is made is preferably a hardenable steel which will give sharp edges for gripping snow or ice.

The operation of my invention is obvious from the above description, but it should be noted that the same is extremely simple and easier to initiate than other similar devices. The skid shoes are preferably carried in pairs, one for each drive wheel. When the automobile becomes stuck in snow or ice, it is necessary to take the skid shoe and insert one with slight pressure in front of each drive wheel. The tread of the tires will immediately engage the lips 12 and then it is possible to drive forward over the skid shoes and thus get a little momentum so as to continue and get out of the rut. If stuck again the same operation is repeated until one gets to a place where normal driving is possible.

It is to be understood that the form of my invention, herewith shown and described, is to be taken as a preferred example of the same and that various changes in the shape, size and arrangement of parts may be resorted to, without departing from the spirit of my invention or the scope of the subjoined claim.

Having thus described my invention, I claim:

A skid shoe for automobile tires comprising a body plate being tapered to a wedge shape at one end and having both sides bent up in parallel fashion to form a channel with the sides at an obtuse angle with its bottom such that the cross-section of said channel will fit tightly over any average tire, said body plate having a large number of projections of two different shapes, said projections of the one kind being in the shape of blunted tongues being bent away from the body plate inwardly into said channel so as to grip a tire without tearing same, and said projections of the other kind being in the shape of a sharp pointed tongue being bent away from said body plate outward so as to grip snow and ice.

References Cited in the file of this patent
UNITED STATES PATENTS

| | | |
|---|---|---|
| 1,339,612 | Wilkins | May 11, 1920 |
| 1,373,042 | Workman | Mar. 29, 1921 |
| 1,388,053 | Moore | Aug. 16, 1921 |
| 1,863,316 | Webster | June 14, 1932 |
| 2,428,680 | Piatak | Oct. 7, 1947 |
| 2,486,911 | Becker | Nov. 1, 1949 |

FOREIGN PATENTS

| | | |
|---|---|---|
| 198,146 | Austria | Nov. 15, 1957 |